Oct. 1, 1968   V. L. HILL ET AL   3,403,857

REACTION BARRIER MATERIAL FOR ROCKET NOZZLE SYSTEMS

Filed March 9, 1964   2 Sheets-Sheet 1

PHOTOMICROGAPH (250X) OF PLASMA ARC SPRAYED HAFNIUM NITRIDE COATING ON TUNGSTEN ELEMENT EXPOSED IN CONTACT WITH CARBON POWDER AT 5400°F. FOR 180 SECONDS

INVENTORS
Vernon L. Hill &
Warren S. Sherman
BY Peter P. Kozak
ATTORNEY

PHOTOMICROGRAPH (100X) OF UNCOATED TUNGSTEN ELEMENT EXPOSED TO ABLATING NYLON GASES AT 5400°F. FOR 180 SECONDS

PHOTOMICROGRAPH (100X) OF TUNGSTEN ELEMENT COATED WITH 0.01 INCH THICK HAFNIUM NITRIDE BARRIER LAYER AND EXPOSED TO ABLATING NYLON GASES AT 5400°F. FOR 180 SECONDS

:::::::::::::::::::::::::::::::::::::::::::::::::::::::::::::::::::::::::::::::::

United States Patent Office 3,403,857
Patented Oct. 1, 1968

3,403,857
REACTION BARRIER MATERIAL FOR ROCKET NOZZLE SYSTEMS
Vernon L. Hill and Warren S. Sherman, Indianapolis, Ind., assignors to General Motors Corporation, Detroit, Mich., a corporation of Delaware
Filed Mar. 9, 1964, Ser. No. 351,587
5 Claims. (Cl. 239—265.15)

ABSTRACT OF THE DISCLOSURE

In high temperature operating devices, such as gas turbines, the carbon eutectic melting of tungsten elements due to the presence of carbon is prevented by a barrier layer of hafnium nitride adjacent the tungsten surfaces exposed to the carbon.

---

The present invention relates generally to composite structural materials having high resistance to thermal and chemical degradation and excellent structural strength for use under abnormally severe operating conditions, such as the high temperatures and extremely corrosive environmental conditions encountered in the operation of rocket motors. More particularly, the present invention relates to a means of preventing the thermal or chemical deterioration of refractory structural materials, such as graphite, tungsten or other refractory metals, which are commonly used in high temperature operating devices, such as rocket nozzle systems.

As is well-known, rocket nozzle systems, and particularly nozzle systems in solid fuel rockets, normally operate for relatively short periods of time at extremely high temperatures, such as about 6500° F., due to the passage of hot corrosive exhaust gases through the system during rocket operation. Thus, the structural components employed in rocket nozzle systems must be capable of withstanding the high operating temperatures and corrosive environmental conditions encountered during nozzle operation, since any thermal or chemical deterioration of the structural components of the nozzle system may result in the malfunctioning of the rocket.

For instance, the dimensions of the orifice or throat portion of a typical convergent-divergent- or venturi-type rocket nozzle arrangement have a great effect on the thrust characteristics of the rocket, and therefore, they are quite critical to proper rocket operation. Hence, any alterations in the dimensions of the nozzle throat portion which take place during rocket operation due to the chemical or thermal erosion of the structural components of this portion of the nozzle will alter the thrust characteristics of the nozzle and may cause the rocket to malfunction.

Thus, high melting point refractory metals having excellent thermal- and corrosion-resistant properties, such as tungsten, molybdenum, tantalum or alloys of these metals, are commonly used to form the structural components of a rocket nozzle system. Tungsten is particularly useful in this regard, and many rocket nozzle systems in common use today include heat-resistant liners and other structural components made of tungsten or tungsten base alloys.

However, many rocket nozzle systems which employ refractory metal materials, such as tungsten, also include carbon-containing structural components made of materials such as graphite in a contacting arrangement with the refractory metal structural components. For instance, graphite structural components are often employed as a combination heat sink and support structure for a tungsten nozzle liner in conventional rocket nozzle systems.

The problem encountered in such an arrangement is that a relatively low temperature eutectic mixture of tungsten and carbon is formed at 4950° F. consisting of alpha-$W_2C$ and W which results in the melting of the tungsten components of the nozzle system at a temperature considerably below the melting point of pure tungsten. This eutectic melting usually results in the premature destruction or deterioration of the tungsten components of the nozzle system during rocket operation which causes changes in the critical dimensions of the nozzle structure and often results in the malfunctioning of the rocket. Similar detrimental effects occur when other refractory metal materials, such as molybdenum and tantalum or alloys of these metals, are employed in a rocket nozzle system, since these latter materials also form relatively low melting eutectic mixtures with carbon.

Moreover, rocket nozzle systems frequently operate at temperatures considerably higher than the melting temperatures of the refractory metal materials, such as tungsten, which are used in constructing the nozzles. Thus, in order to prevent the refractory metal structural components of the nozzle system from melting at these high operating temperatures, recent developments have led to the incorporation of solid coolants, such as nylon and polyethylene, in the nozzle construction. During nozzle operation, the solid coolant is evaporated, and the gas so formed flows along the walls of the nozzle between the high temperature exhaust gases and the comparatively low melting temperature nozzle structural components to provide a transpiration-type cooling effect on the nozzle components.

However, when solid coolant materials, such as nylon and polyethylene, are employed in a transpiration-type nozzle cooling system as described above, ablating carbonaceous gases are formed during nozzle operation which may come into contact with the refractory metal structural components of the nozzle system resulting in the formation of the aforementioned relatively low melting eutectic mixtures. As previously mentioned, this eutectic melting usually causes the premature deterioration of the refractory metal components of the nozzle system and often results in the malfunctioning of the rocket during operation. Obviously, the provision of refractory structural materials for use in rocket nozzle systems or similar devices which substantially eliminate the problems resulting from eutectic melting is desirable.

Therefore, it is the basic object of the present invention to provide composite structural materials having high resistance to thermal and chemical degradation and excellent structural strength for use under abnormally severe operating conditions, such as the high temperatures and corrosive environmental conditions which are encountered in rocket nozzle systems.

It is another object of the present invention to provide a means for minimizing eutectic melting of the structural components in a rocket nozzle system or similar high temperature operating device containing refractory metal materials, such as tungsten, and carbonaceous materials.

These and other objects are accomplished in accordance with the present invention by providing a relatively thin chemical reaction barrier coating which is substantially hafnium nitride on the refractory metal and/or carbon structural components of a rocket nozzle system or similar high temperature operating device to prevent the premature destruction or deterioration of these components of the device during operation due to the formation of the relatively low melting refractory metal-carbon eutectic mixtures. The hafnium nitride coating may be applied by any suitable means, such as plasma arc spraying, electrophoretic deposition and slurry coating, although plasma arc spraying is preferred.

Other features and advantages of the present invention will be apparent from the following detailed description of certain embodiments thereof, in conjunction with the accompanying drawings, in which.

Figure 3:
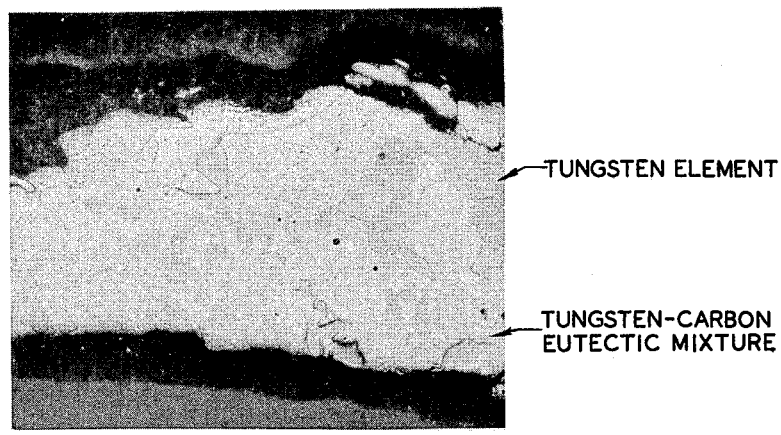
Figure 4:
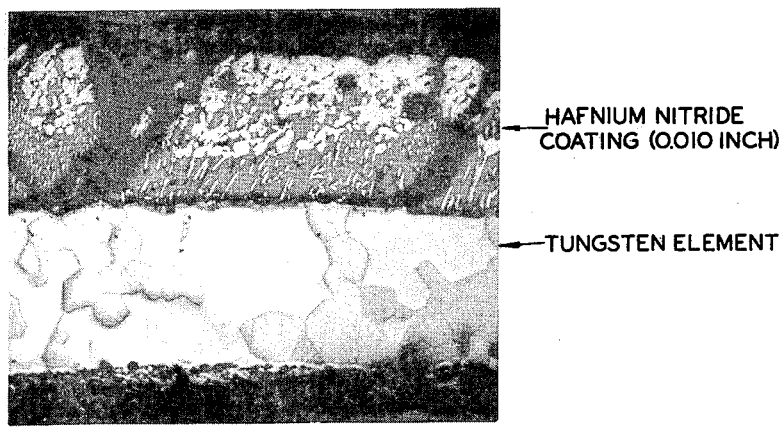

FIGURE 3 is a photomicrograph (100×) showing an uncoated tungsten element which has been exposed to ablating nylon gases for 180 seconds at 5400° F.; and FIGURE 4 is a photomicrograph (100×) showing a tungsten element which has been coated in accordance with the present invention with a reaction barrier layer consisting essentially of hafnium nitride and exposed to ablating nylon gases for 180 seconds at about 5400° F.

Figure 1:
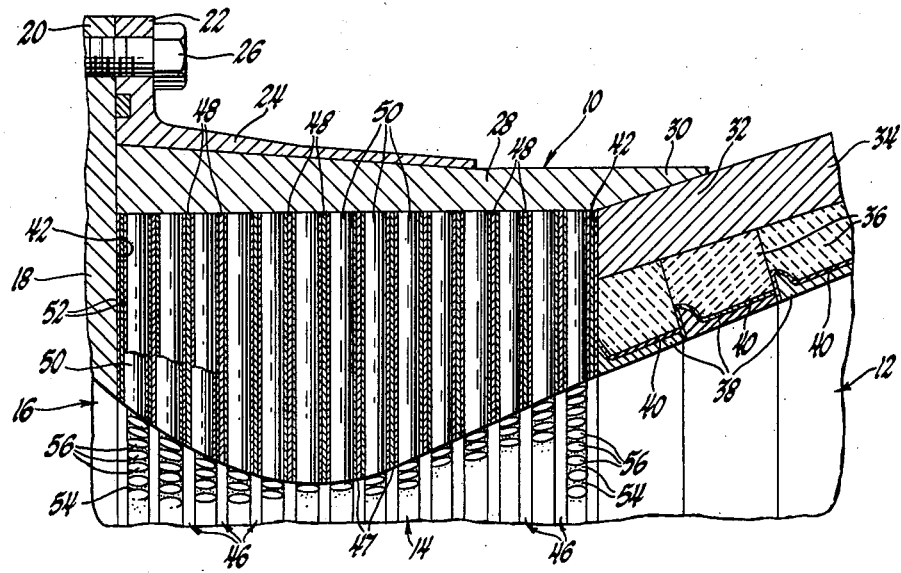
FIGURE 1 is a partial side elevational view, with parts broken away and in section, of a typical rocket nozzle system embodying the present invention.

Referring to FIGURE 1 of the drawings, a fixed nozzle structure of the convergent-divergent-type embodying the present invention is illustrated. The nozzle structure 10 may be used in a rocket or other high temperature operating device and is similar in structural detail to the nozzle construction disclosed in the United States patent application Ser. No. 162,311 Prosser et al., filed Dec. 21, 1961, now Patent No. 3,282,421 which is assigned to the assignee of the present invention.

The nozzle structure 10 has a diverging conical exhaust gas exit portion 12, an annular throat or venturi portion 14 and a converging conical inlet portion 16 connected to the rear end of an annular casing 18. The casing 18 may be provided with the appropriate internal contour to form part of the converging inlet portion 16 of the nozzle structure, as illustrated in FIGURE 1 of the drawings. Also, the casing may constitute a portion of a rocket combustion chamber or the rear end of any other suitable reaction motor duct and may be constructed of a suitable insulating material.

The throat and exit portions of the nozzle structure may be formed integral with the converging inlet portion or, as shown in FIGURE 1, may be secured thereto by any suitable means, such as by the flange 20 of the casing 18 affixed to the flange 22 of an annular metal shroud 24 by means of a bolt 26. The annular flanged shroud 24 may be cemented or otherwise secured to cylindrical metal casing portion 28. The downstream edge 30 of the casing 28 is likewise cemented or otherwise secured to the inlet end 32 of the hollow conical nozzle metal exit casing 34.

A number of axially stacked graphite rings 36 are secured within the exit casing 34 to insulate it against the heat of the exhaust gases which pass therethrough. The graphite rings also function as a structural backing material for a heat-resistant tungsten liner 38 which is provided over the internal surface of each graphite ring. Of course, the liner 38 may be made of other refractory metal materials, such as molybdenum, tantalum or tungsten base alloys.

In accordance with the present invention, a thin chemical reaction barrier layer or coating 40 which is substantially hafnium nitride is provided between the graphite rings 36 and the tungsten liners 38 to prevent the formation of the relatively low melting tungsten-carbon eutectic mixture during nozzle operation. The barrier coating 40 may be applied directly to either the graphite rings 36 or to the tungsten liners 38 by any suitable means, such as plasma arc spraying, electrophoretic deposition or slurry coating. However, the coating is preferably applied to the tungsten liners, since better bonding characteristics are obtained. The thickness of the hafnium nitride coating 40 is greatly exaggerated in the drawings for purpose of illustration. A coating having a thickness up to about 0.010 inch but not less than about 0.005 inch is suitable in most nozzle systems utilizing the present invention, as will hereinafter be more fully explained.

The throat portion 14 of the nozzle structure 10 is positioned in the cylindrical groove 42 between the converging and diverging portions 16 and 14, respectively, of the nozzle structure described above. The throat portion 14 is formed of a plurality of thin, annular, cylindrical sections 46 which are coaxially aligned in the groove 42 and are secured to each other and to the casing 30 by any suitable means in a stacked arrangement, as shown in FIGURE 1. The centrally located openings 47 in each section are of varying radial extent to provide the desired contour to the throat portion of the nozzle structure.

Each of the sections 46 consists of a flat, annular refractory metal washer or apertured plate 48 made of tungsten or other suitable refractory metal material which is secured by brazing or the like to a plurality of circumferentially separated refractory metal rods or wires 50. The wires 50 in each section are of the same diameter and length and may be made of any suitable refractory metal material, such as tungsten. The wires lie flat against the face of the washer so that they are radially disposed in a spoke-like manner to provide tapered spaces between the wires which increase progressively in width toward the radially outer edge of the washers 48. In accordance with the present invention, the refractory metal washers 48 and wires 50 comprising each section 46 are provided with a thin chemical reaction barrier coating 52 which is substantially hafnium nitride. As in the instance of the hafnium nitride coating 40 shown in the drawings on the tungsten liners 38, the thickness of the hafnium nitride coating 52 provided on the tungsten washer and wire elements comprising the throat section of the nozzle structure is greatly exaggerated for purpose of illustration.

The tapered spaces between the wires and adjacent washers each contain a solid cooling medium 54, such as nylon or polyethylene, which is released as a vapor due to the heat of the hot exhaust gases which pass through the nozzle during operation. These released ablating gases from the coolant 54 flow out into the throat portion of the nozzle between the hot nozzle exhaust gases and the tungsten elements in the throat portion to provide a transpiration-type cooling effect, as described in the above-referenced U.S. patent application Ser. No. 162,311 Prosser et al. The radial ends 56 of the wires 50 have only a minute clearance between them to provide metered openings which control the flow of the gaseous coolant along the nozzle throat surface.

Nylon is an excellent solid coolant for this purpose, since it degrades to form a low molecular weight carbonaceous gas at a temperature of about 2000° F. However, this ablating nylon carbonaceous cooling gas may react with the refractory metal elements comprising the throat portion of the nozzle structure to form the relatively low melting refractory metal-carbon eutectic mixture. As previously mentioned, this eutectic melting may cause the destruction or premature deterioration of the refractory metal elements in the throat section which may result in the malfunctioning of the nozzle system. However, by employing the hafnium nitride reaction barrier coating 52 on the refractory metal elements comprising the throat section of the nozzle structure in accordance with the present invention, the formation of the low temperature melting eutectic mixture is substantially eliminated during nozzle operation.

Hafnium nitride is a high temperature refractory material having a melting point of about 5900° F., and it also exhibits relatively high resistance to carburization, which accounts for its effectiveness as a chemical reaction barrier layer. The hafnium nitride employed in accordance with the present invention may contain relatively minor concentrations of impurities, such as zirconium or hafnium dioxide. However, the concentration of these impurities in the hafnium nitride coating should not exceed about 10%, by weight, and preferably is less than 1%, by weight, so as not to significantly alter the melting or structural characteristics of the coating.

As previously mentioned, the hafnium nitride reaction barrier coating may be applied to the refractory metal or graphite components of a rocket nozzle system by any suitable means, such as conventional plasma arc spraying techniques, slurry coating or electrophoretic deposition. However, in the preferred embodiment of the invention, the coating is applied to the refractory metal or graphite components by a plasma arc spraying technique in which the hafnium nitride is in the form of a —200 to +325 mesh powder, and a plasma gas flow rate of about 150 cubic feet of argon per hour plus 20 cubic feet of nitrogen per hour is employed.

The desired thickness of the reaction barrier coating which is applied to either the refractory metal or carbonaceous components of a particular nozzle system may vary in accordance with the specific nozzle operating conditions involved, since the rate of carburization of the hafnium nitride varies with temperature. Also, although hafnium nitride carburizes at a relatively slow rate, exposure time must be accounted for in providing a barrier layer of effective thickness. For instance, in a rocket nozzle system which was operated for about 180 seconds at a temperature of about 5400° F., a barrier layer of about 0.010 inch in thickness was found suitable to prevent the formation of the eutectic tungsten-carbon mixture, whereas a coating 0.006 inch in thickness resulted in eutectic melting under the same nozzle operating conditions.

Thus, as previously mentioned, the hafnium nitride reaction barrier coating may be applied directly to graphite or refractory metal structural components, such as are found in the above-described rocket nozzle system, although better adhesion and bonding properties are generally obtained by applying the coating to the refractory metal elements, and particularly tungsten elements. However, in specific tests, a graphite substrate was coated by the above-mentioned arc plasma spraying technique with 0.010 inch thick hafnium nitride coating, and the coating was subsequently subjected to a temperature of 5400° F. for 180 seconds in contact with a sheet of tungsten metal. No eutectic melting of the tungsten or graphite elements resulted from these test conditions.

Figure 2:
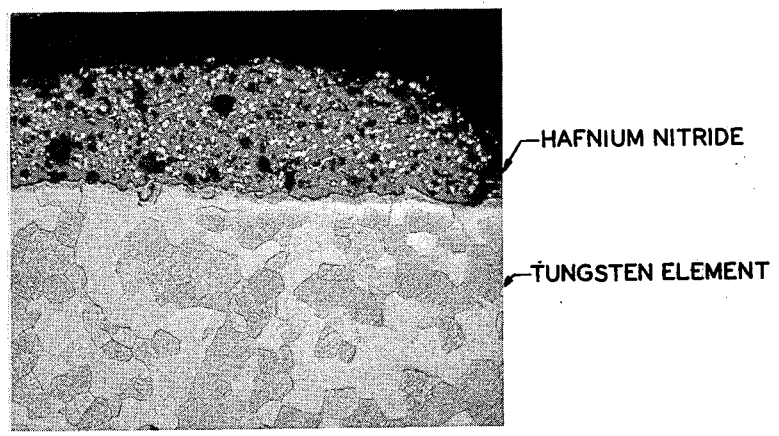
FIGURE 2 is a photomicrograph (250×) of a tungsten element having a plasma arc sprayed hafnium nitride coating thereon which was heated in contact with graphite powder to about 5400° F. for 180 seconds.

Referring to FIGURE 2 of the drawings, a tungsten substrate was similarly arc plasma spray coated with a layer of hafnium nitride to a thickness of about 0.010 inch and subsequently placed in contact with graphite powder at a temperature of 5400° F. for 180 seconds with no resulting eutectic melting. Moreover, in the latter instance, a diffusion zone at the tungsten-hafnium nitride interface was formed during the arc plasma spraying procedure which explains the excellent bonding characteristics which may be obtained between the hafnium nitride coating and tungsten metal.

As previously mentioned, the hafnium nitride chemical reaction barrier may also be applied to refractory metal structural components of an ablating nylon, transpiration cooled rocket nozzle system to prevent the formation of the refractory metal-carbon eutectic mixture due to the passage of carbonaceous ablating nylon gases over the metallic structural components.

In FIGURE 3 of the drawings, a photomicrograph of an uncoated tungsten element which was exposed to ablating nylon gases for 180 seconds at 5400° F. is illustrated. It will be noted that the structure in the lower half of the tungsten layer is that of the tungsten-carbon eutectic mixture. In a similar test, a tungsten element was arc plasma spray coated with a hafnium layer to a thickness of 0.010 inch, and the element was subsequently exposed to the ablating nylon gases for 180 seconds at 5400° F. As shown in FIGURE 4 of the drawings, the latter test resulted in no eutectic melting. Under some conditions, hafnium nitride coatings have proved to be an effective chemical reaction barrier material between tungsten and carbonaceous materials at temperatures as high as 5700° F.

While we have described the present invention in terms of certain preferred embodiments and specific examples, it is not intended to be limited thereby, and other changes and modifications may be made thereto without departing from the intended scope of the present invention, as defined by the following claims.

We claim:

1. A device for use at high operating temperatures comprising a graphite backing element and a tungsten element superimposed thereon, said elements being separated at their common interfaces by a relatively thin chemical reaction barrier layer which is substantially hafnium nitride, said layer being highly resistant to carburization and having a thickness not less than about 0.005 inch thick so that the tungsten-carbon eutectic melting of said elements at the high operating temperatures of said device is prevented, said layer being bonded to at least one of said elements by a plasma arc spraying technique.

2. A rocket nozzle system for use at high operating temperatures, said system comprising a graphite base element and tungsten liner superimposed thereon, said liner and said elements being separated at their common interfaces by a relatively thin chemical reaction barrier layer which is substantially hafnium nitride to prevent the tungsten-carbon eutectic melting of said liner and said element at the high operating temperatures of said system, said layer being bonded to said liner.

3. A rocket nozzle system for use at high operating temperatures, said system comprising a diverging conical exhaust gas exit portion, said portion having graphite structural elements therein and a heat-resistant tungsten liner superimposed on said graphite elements, said liner and said elements being separated at their common interface by a relatively thin chemical reaction barrier layer which is substantially hafnium nitride to prevent the formation of the relatively low melting tungsten-carbon eutectic mixture at the high operating temperatures of said system, said layer being bonded to said liner by a plasma arc spraying technique.

4. A rocket nozzle system for use at high operating temperatures, said system comprising a converging exhaust gas inlet portion, a contoured throat portion and a diverging exhaust gas exit portion, said throat portion having a plurality of tungsten structural elements therein providing the desired contour to said throat portion, said elements having spaces therebetween containing a solid coolant material, said coolant releasing carbonaceous gases to cool said portions of said nozzle system during operation, said elements in said throat portion being provided with a relatively thin chemical reaction barrier layer which is substantially hafnium nitride to prevent the tungsten-carbon eutectic melting of said elements during system operation.

5. A device for use at high operating temperatures including a composite refractory structure adapted for exposure to a high temperature carbonaceous environment comprising a tungsten element and a carbon element adjacent one another and separated at their common interface by a relatively thin hafnium nitride chemical reaction barrier layer to prevent the tungsten-carbon eutectic melting of said tungsten element at the high operating temperatures of said device, said layer being bonded to at least one of said elements.

References Cited

UNITED STATES PATENTS

| | | | |
|---|---|---|---|
| 3,048,972 | 8/1962 | Barlow | 239—265.15 |
| 3,122,883 | 3/1964 | Terner | 60—35.6 |
| 3,137,998 | 6/1964 | Beam | 239—265.15 |
| 3,145,529 | 8/1964 | Maloof | 60—35.6 |
| 3,282,421 | 11/1966 | Prosser et al. | 239—127.3 |

OTHER REFERENCES

"Stability of Refractory Compounds in Hydrogen Between 4500° F., and their Compatibility with Tungsten" by Charles E. May and Paul D. Hoekstra, NASA TND844, May 1961, pp. 1–7.

EVERETT W. KIRBY, *Primary Examiner.*